United States Patent
Ge et al.

(10) Patent No.: US 11,733,419 B2
(45) Date of Patent: Aug. 22, 2023

(54) REMOVAL OF SIGNAL RINGDOWN NOISE

(71) Applicant: Halliburton Energy Services, Inc., Houston, TX (US)

(72) Inventors: Yao Ge, Singapore (SG); Xiang Wu, Singapore (SG); Jing Jin, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 219 days.

(21) Appl. No.: 16/499,452

(22) PCT Filed: Dec. 27, 2018

(86) PCT No.: PCT/US2018/067730
§ 371 (c)(1),
(2) Date: Sep. 30, 2019

(87) PCT Pub. No.: WO2020/139354
PCT Pub. Date: Jul. 2, 2020

(65) Prior Publication Data
US 2021/0124076 A1 Apr. 29, 2021

(51) Int. Cl.
*G06F 11/34* (2006.01)
*G01V 1/50* (2006.01)
(Continued)

(52) U.S. Cl.
CPC .............. *G01V 1/50* (2013.01); *G01V 1/303* (2013.01); *G01V 1/364* (2013.01); *G06F 17/18* (2013.01);
(Continued)

(58) Field of Classification Search
CPC .......... G01V 1/303; G01V 1/364; G01V 1/50; G01V 2210/324; G01V 2210/6222; G06F 17/18
See application file for complete search history.

(56) References Cited

U.S. PATENT DOCUMENTS 5,437,194 A * 8/1995 Lynnworth ............. G01F 1/662
73/861.27
5,469,736 A 11/1995 Moake
(Continued)

FOREIGN PATENT DOCUMENTS

EP 2887101 A1 6/2015

OTHER PUBLICATIONS

Neal C. Gallageher, "Median Filters: A Tutorial", 1988, IEEE Publication, pp. 1737-1744 (Year: 1988).*
(Continued)

*Primary Examiner* — Elias Desta
(74) *Attorney, Agent, or Firm* — Delizio, Peacock, Lewin & Guerra

(57) ABSTRACT

Ringdown noise can be estimated and removed from a waveform captured by a downhole tool. Ringdown may be estimated by calculating a median of waveforms from a number of tool firings. The estimated ringdown may then be subtracted from a waveform currently being processed. The resulting waveform contains a more accurate representation of a true echo signal reflected from the borehole wall or formation. In some embodiments, the acoustic transducer's deterministic waveform may be learned by statistical analysis of other waveforms near in time to the presently measured waveform. In other embodiments, the deterministic waveform may be learned via previously acquired waveforms now stored in memory, or through predictive waveforms developed in laboratory testing conditions similar to those experienced downhole.

20 Claims, 8 Drawing Sheets

(51) Int. Cl.
*G01V 1/30* (2006.01)
*G01V 1/36* (2006.01)
*G06F 17/18* (2006.01)

(52) U.S. Cl.
CPC .................. *G01V 2210/324* (2013.01); *G01V 2210/6222* (2013.01)

(56) References Cited

U.S. PATENT DOCUMENTS

| | | |
|---|---|---|
| 5,763,773 A | 6/1998 | Birchak et al. |
| 5,987,385 A | 11/1999 | Varsamis et al. |
| 7,254,277 B2 | 8/2007 | Kempf et al. |
| 8,861,814 B2 | 10/2014 | Salazar-Tio |
| 8,913,461 B2 | 12/2014 | Steinsiek et al. |
| 9,013,955 B2 | 4/2015 | Zhao |
| 2016/0018549 A1 | 1/2016 | Tracadas |
| 2016/0033663 A1 | 2/2016 | Lu et al. |
| 2017/0212263 A1 | 7/2017 | Zhang et al. |
| 2020/0408806 A1* | 12/2020 | Bhargava ............... G01Q 20/02 |

OTHER PUBLICATIONS

PCT Application Serial No. PCT/US2018/067730, International Search Report, dated Sep. 24, 2019, 3 pages.
PCT Application Serial No. PCT/US2018/067730, International Written Opinion, dated Sep. 24, 2019, 6 pages.
Kim, et al., "Removal of Ringing Noise in GPR Data by Signal Processing", Geosciences Journal, vol. 11 No. 1, Mar. 2007 pp. 75-81.

\* cited by examiner

REMOVAL OF SIGNAL RINGDOWN NOISE

TECHNICAL FIELD

This disclosure generally relates to the field of earth or rock drilling (mining), and more particularly to determining formation properties of a geological formation using a technique for removal of signal noise to improve the function of a downhole tool.

BACKGROUND ART

Oilfield operators demand access to a great quantity of information regarding the conditions encountered downhole. Such information typically includes characteristics of the earth formations traversed by the borehole and data relating to the size and configuration of the borehole itself. The collection of information relating to conditions downhole, which commonly is referred to as "logging," can be performed by several methods including "logging while drilling" (LWD) and wireline logging.

Among the available wireline and LWD tools are a variety of acoustic logging tools including, in particular, ultrasonic "caliper" tools. Such tools employ high-frequency acoustic signals to perform measurements, for example, measuring a distance to the borehole wall. A transducer emits a high-frequency pulse that is reflected by the pipe or borehole wall back to the transducer. The diameter is determined from the time of flight of this echo and the fluid acoustic velocity. The transducer is rotated to produce a cross section of the borehole size and full-coverage images of the borehole wall. The measurement can have high resolution and be used to detect deformations, the buildup of scale, or metal loss due to corrosion. The amplitude of the echo from the inner casing surface can provide qualitative information on the state of the surface, such as rugosity or corrosion. Casing thickness may also be measured simultaneously, either by analysis of the casing resonance signal, or by detecting separately the echoes from the inner and outer casing surfaces. In an open hole, the amplitude of the echo from the borehole wall can provide qualitative information on the borehole rugosity and presence of natural and drilling-induced fractures. By plotting the amplitude into an image, the image provides information on dip angle, location of break out, wash out and other critical information for drilling operation. Additionally, with an appropriate set of distance measurements, the borehole size and shape can be estimated, as well as the relative position of the tool within the borehole.

Acoustic transducers utilized in the ultrasonic caliper tools face many performance challenges including the "ringdown" phenomena due to the transducer's mechanical motion failing to instantly cease when a driver signal is removed. Due to the transmitted signal overlapping with a received signal, there is some residual motion and vibration which creates noise that affects a received signal. This phenomenon may be reduced by use of improved transducers, however, such may prove costly when compared to off-the-shelf transducers currently available and used.

BRIEF DESCRIPTION OF THE DRAWINGS

Embodiments of the disclosure may be better understood by referencing the accompanying drawings.

DESCRIPTION OF EMBODIMENTS

Figure 1:
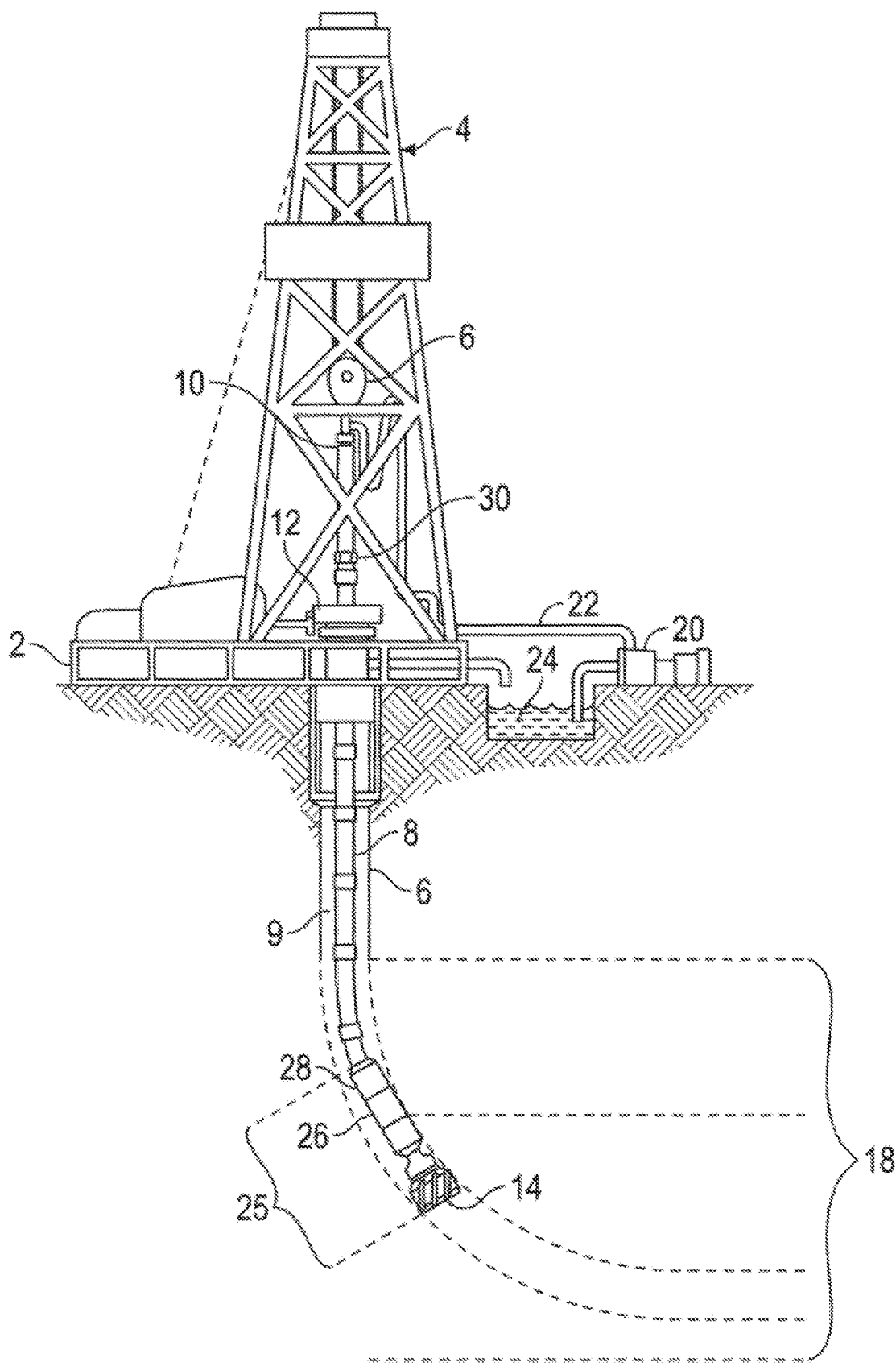
FIG. 1 is a schematic diagram of an illustrative environment for logging while drilling.

The description that follows includes example systems, methods, techniques, and program flows that embody embodiments of the disclosure. However, it is understood that this disclosure may be practiced without these specific details. For instance, this disclosure refers to reducing the ringdown noise experienced by a transducer in an ultrasonic caliper in illustrative examples. Embodiments of this disclosure can be also applied to other tools which experience a ringdown noise effect in an acquired signal. In other instances, well-known instruction instances, protocols, structures and techniques have not been shown in detail in order not to obfuscate the description.

INTRODUCTION

When using transducers for imaging or standoff measurement, the waveform can contain ringdown noise from the transducer ringing. Ringdown noise may be a ringdown waveform or noise conveyed between transducers through the tool body. Transducers are present in a number of commercially available instruments including LWD and wireline tools. If such transducers are exposed to extreme conditions, degrade over time, or have only a nominal quality to begin with, they can experience variable or long ringdown characteristics. Such ringdown characteristics may interfere with acoustic waveform measurements, reducing instrument sensitivity and commensurate detectability of the return echo(s). The ringdown noise can be higher than the amplitude of the echo making it difficult to identify the echo due to a poor signal-to-noise ratio (SNR). The ringdown noise is a challenge especially in heavy mud or when the standoff is large.

Overview

To reduce SNR and provide a more accurate waveform, ringdown noise can be estimated and removed from a waveform captured by a downhole tool. Ringdown may be estimated by calculating a median of waveforms from a number of tool firings, such as waveforms near in time to a waveform currently being processed. In other embodiments, the ringdown waveform may be learned via previously acquired waveforms now stored in memory, or through predictive waveforms developed in laboratory testing conditions similar to those experienced downhole. The estimated ringdown may then be subtracted from a waveform received from an acoustic transducer of a downhole tool, thereby resulting in a waveform containing a more accurate representation of a true echo signal reflected from the borehole wall or formation. Using the median of waveforms provides a more stable and accurate estimation of ringdown noise than existing methods which may use a mean or other averaging technique to estimate ringdown from waveforms. Accurate removal of ringdown noise is critical when performing high resolution borehole imaging in oil-based muds which are highly attenuative to ultrasounds. Accurate removal of ringdown noise using techniques presented herein allows for acoustic tools to be used as an alternative to micro-resistivity tools for performing high resolution borehole imaging in oil-based muds. Previously, acoustic tools for performing high resolution borehole imaging were generally only effective in water-based muds, as their use in oil-based muds was problematic due to the highly attenuative properties of the oil-based muds. Overall, the ringdown noise removal techniques described herein allow for increased accuracy and reliability in the performance of downhole tools and acquired signals.

Example Illustrations

FIG. 1 is a schematic diagram of an illustrative environment for LWD. In FIG. 1, a drilling platform 2 supports a derrick 4 having a traveling block 6 for raising and lowering a drill string 8. A drill string kelly 10 supports the rest of the drill string 8 as it is lowered through a rotary table 12. The rotary table 12 rotates the drill string 8, thereby turning a drill bit 14. As the drill bit 14 rotates, it creates a borehole 16 that passes through various formations 18. A pump 20 circulates drilling fluid through a feed pipe 22 to the kelly 10, downhole through the interior of drill string 8, through orifices in the drill bit 14, back to the surface via the annulus 9 around the drill string 8, and into a retention pit 24. The drilling fluid transports cuttings from the borehole 16 into the pit 24 and aids in maintaining the integrity of the borehole 16.

The drill bit 14 is just one piece of an open-hole LWD assembly that includes one or more drill collars 26 and logging tool 28. Drill collars 26 are thick-walled steel pipe sections that provide weight and rigidity for the drilling process. The logging tool 28 (which may be built into one of the drill collars) gathers measurements of various drilling or formation parameters. Without limitation, logging tool 28 may be integrated into the bottom-hole assembly 25 near the bit 14 to collect measurements. The collected measurements may be plotted and used for steering the drill string 8 and/or to analyze formation properties. In accordance with at least some embodiments, the logging tool 28 corresponds to an acoustic logging tool with one or more high-purity acoustic transmitters as described herein.

Measurements from the logging tool 28 can be acquired by a telemetry sub (e.g., integrated with logging tool 28) to be stored in internal memory and/or communicated to the surface via a communications link. Mud pulse telemetry is one common technique for providing a communications link for transferring logging measurements to a surface receiver 30 and for receiving commands from the surface, but other telemetry techniques can also be used. In accordance with at least some embodiments, measurements collected from the logging tool 28 are processed by a computer system to produce one or more well logs for analysis by a user. The contemplated logs include acoustic logging measurements such as the propagation velocities of compressional and shear waves, the received waveforms, and derivable values such as acoustic impedance.

Figure 2:
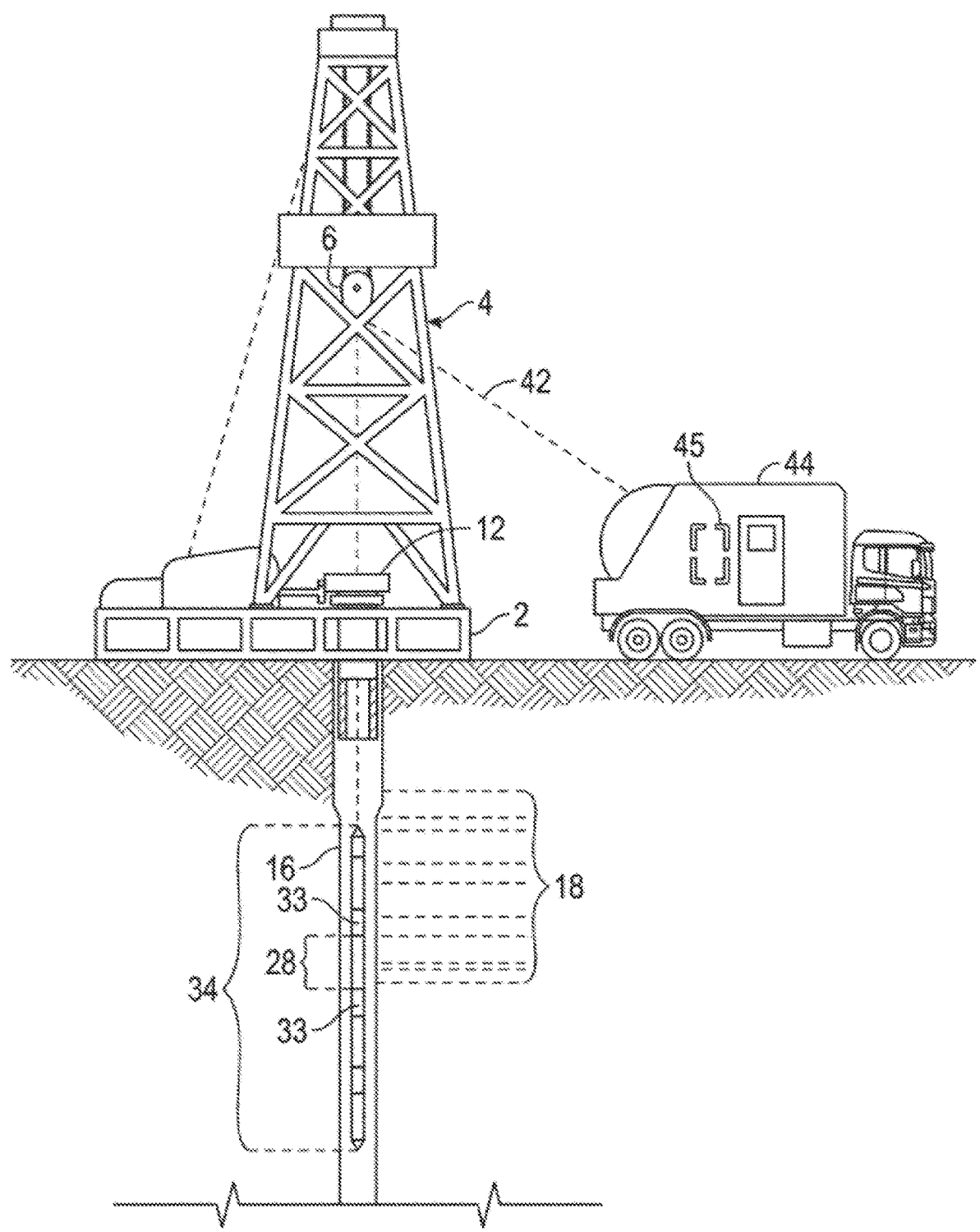
FIG. 2 is a schematic diagram of an environment for wireline logging.

FIG. 2 is a schematic diagram of an environment for wireline logging. At various times during the drilling process, the drill string 8 may be removed from the borehole 16 as shown in FIG. 2. Once the drill string has been removed, logging operations can be conducted using a wireline logging sonde 34 suspended by a cable 42 having conductors for transporting power to the logging sonde 34 and telemetry from the logging sonde 34 to the surface. In some embodiments, the logging sonde 34 may have pads and/or centralizing members to maintain the tool near the axis of the borehole as the tool is pulled uphole.

It should be noted that various types of formation property sensors can be included with the wireline logging string 34. As shown, the illustrative wireline logging string 34 includes logging tool 28, which may collect acoustic logging data as described herein. The logging tool 28 may be coupled to other modules of the wireline logging string 34 by one or more adaptors 33. A logging facility 44 collects measurements from the logging sonde 34, and includes a computer system 45 for processing and storing the measurements gathered by the sensors. Among other things, the computer system 45 may include a non-transitory computer-readable medium (e.g., a hard-disk drive and/or memory) capable of executing instructions to perform such tasks. In addition to collecting and processing measurements, the computer system 45 may be capable of controlling the logging string 34 and logging tool 28. The logging facility 44 may further include a user interface (not shown) which displays the measurements, for example, a monitor or printer.

Figure 3:
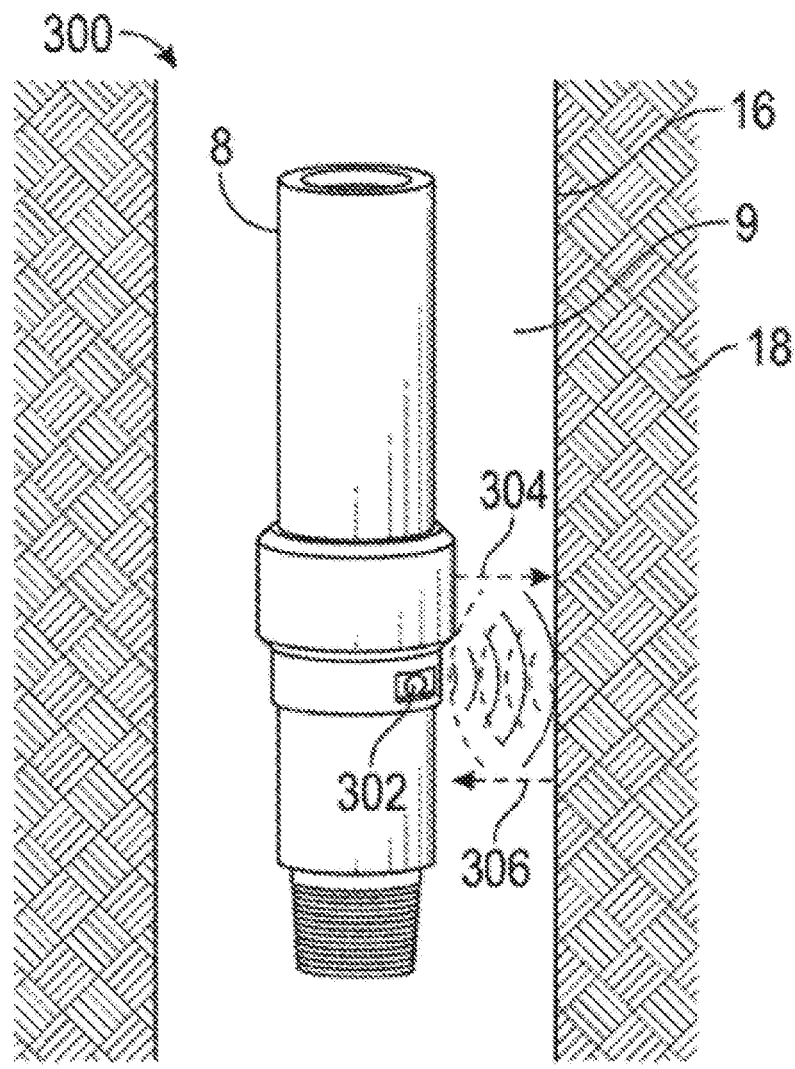
FIG. 3 is a schematic diagram of an acoustic wave generation and measurement tool having a single acoustic transducer.

FIG. 3 is a schematic diagram of an acoustic wave generation and measurement tool having a single acoustic transducer. FIG. 3 shows an illustrative acoustic wave generation and measurement tool 300 (hereinafter "tool 300") having a single acoustic transducer 302. The tool 300 may be similar to the logging tool 28 of FIGS. 1 and 2, thus being part of the drill string 8 (or logging string 34) conveyed downhole within the borehole 16. The acoustic transducer 302 transmits and receives acoustic waveforms to provide caliper measurements. For example, the acoustic transducer 302 may be comprised of a piezoelectric transducer. Upon operation, the acoustic transducer 302 transmits a first acoustic waveform or interrogation waveform 304 towards the borehole 16 wall. Waveforms may sometimes be referred to as waves or signals and may comprise a single pulse, a series of pulses, a continuous wave which occurs for a period of time, etc. Upon interacting with the borehole 16 wall, a second acoustic waveform or return waveform 306 is generated back in the direction of the tool 300 due to acoustic mismatches between the borehole fluid within the annulus 9 and the borehole 16 wall.

The mechanical motion of the acoustic transducer 302 does not instantly cease when a driver signal is removed, thus the acoustic transducer 302 may measure remnants of the interrogation waveform 304 being generated while at the same time recording the reflected return waveform 306, also known as a "ringdown" phenomenon. This phenomenon can be accounted for through implementation of the various methods discussed herein.

Figure 4A:
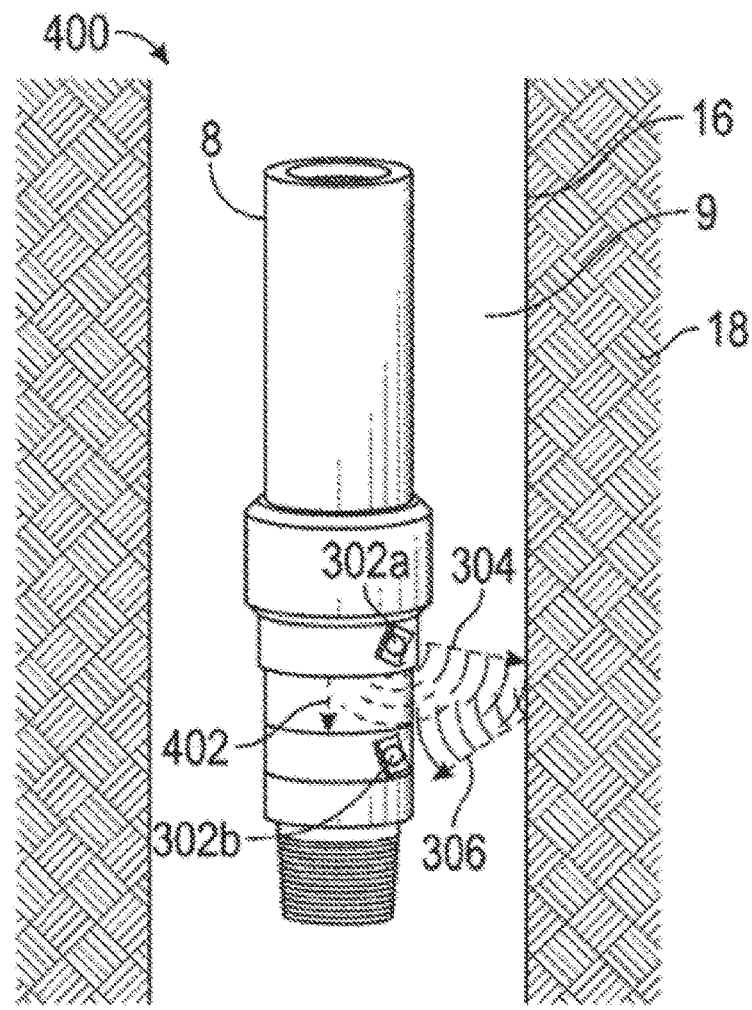
FIGS. 4A and 4B are schematic diagrams of an acoustic wave generation and measurement tool having two acoustic transducers.
Figure 4B:
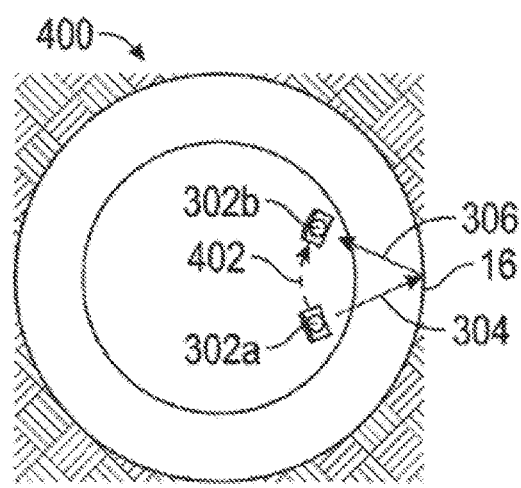

FIGS. 4A and 4B are schematic diagrams of an acoustic wave generation and measurement tool having two acoustic transducers. FIGS. 4A and 4B shows another illustrative acoustic wave generation and measurement tool 400 (hereinafter "tool 400"). In FIG. 4A, the tool 400 may be substantially similar to the tool 300 and therefore may be best understood with reference thereto, where like numerals represent like elements that will not be described again in detail. However, as compared to the tool 300 which depicts a single acoustic transducer 302, the tool 400 depicts two acoustic transducers (shown as a first and second acoustic transducer, 302a and 302b) within the same tool 400.

The first acoustic transducer 302a transmits the interrogation waveform 304 towards the borehole 16 wall which reflects as the return waveform 306 towards the second or receiving acoustic transducer 302b. Due to at least a portion of the interrogation signal also being transmitted through the tool 400 (depicted as a third acoustic waveform 402), an undesirable deterministic waveform is present when the second (receiving) acoustic transducer 302b receives the reflected return waveform 306. Again, this phenomenon can be accounted for through implementation of the various techniques discussed herein.

In some embodiments, such as FIG. 4A, the first and second acoustic transducers 302a and 302b may be vertically aligned on the tool 400. However, it will be appreciated that the acoustic transducers 302a,b may alternatively be azimuthally offset from each other with respect to the center of the tool 400, such as depicted in the top-down view of FIG. 4B. The different arrangements of the acoustic transducers 302a,b can affect the amplitude and amount of experienced ringdown noise. For example, increasing the distance between the acoustic transducers 302a,b should result in less ringdown noise. Tools with multiple transducers, e.g., three or more transducers, may selectively activate the transducers based on a target axis or region of a formation to be interrogated. For example, a pair of transducers may be activated to interrogate along an xy-axis plane and a separate pair to interrogate along an xz-axis plane. The experienced ringdown noise may change based on which transducers are currently activated. Using techniques described herein, the ringdown noise may be individually calculated and reduced for each unique set of activated transducers to account for changes in the activated transducers or the arrangement of the transducers.

Figure 5:
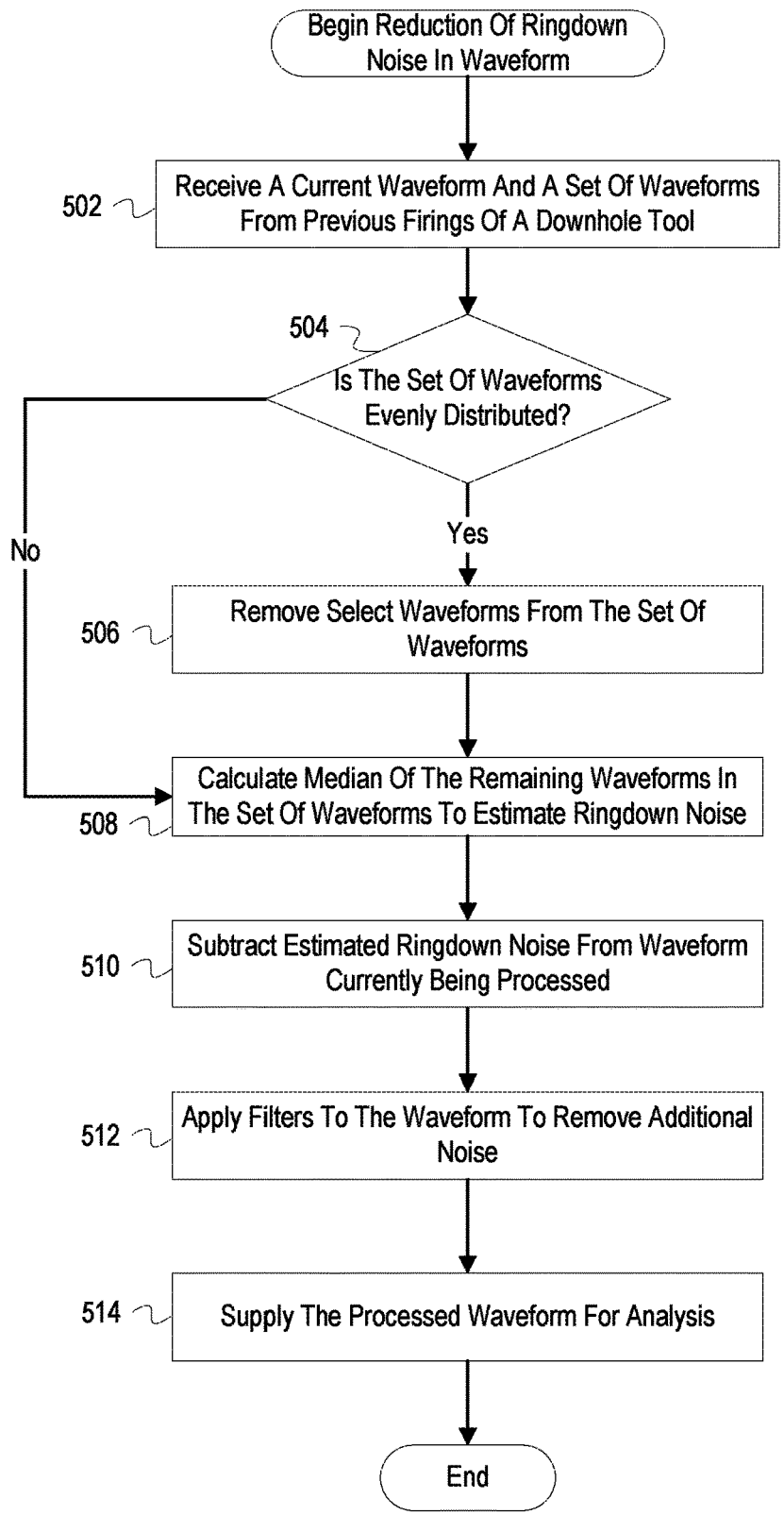
FIG. 5 is a flowchart of example operations for reducing ringdown noise in a waveform.

FIG. 5 is a flowchart of example operations for reducing ringdown noise in a waveform. The description below refers to a signal processor as performing the operations, although the naming of hardware or software for performing the below operations may vary. The signal processor, for example, may be part of the computer system 45 in the logging facility 44 of FIG. 2 or any other computer system receiving signals from or controlling the operation of a downhole tool. The signal processor may also be part of computer system which performs post processing on collected signals outside of the oilfield environments shown in FIGS. 1 and 2.

A signal processor receives a current waveform to be processed and a set of waveforms received from previous firings of a downhole tool (502). The waveforms may have been captured by a transducer, such as an acoustic or ultrasound transducer, which detects signals or waveforms in response to firing of an interrogation waveform, such as an acoustic waveform, into a formation. The transducer may be part of a tool deployed downhole in an LWD or wireline environment. The set of waveforms received/detected in response to the tool firing interrogation waveforms are often referred to as an "echo." The signal processor receives the echoes and stores the echoes as waveforms in a database or other storage such as memory. The current waveform is a recently received waveform from which ringdown noise is to be removed. To estimate the ringdown noise, the signal processor retrieves the set of waveforms from storage for analysis. The set of waveforms may include all waveforms from a time window; a specified number of recently detected waveforms; waveforms collected at a similar depth to the current waveform; waveforms collected from a borehole with similar temperature, pressure, and mud property; waveforms collected from a formation with similar properties to the current formation, etc. For example, if the current waveform was collected at a depth of 100 meters, the signal processor may retrieve waveforms which were collected from depths of 85 to 115 meters. As an additional example, the signal processor may retrieve the previous 29 waveforms detected by the downhole tool based on 29 waveforms being previously determined as the ideal number of waveforms for estimating ringdown noise. The ideal number of waveforms can be determined based on simulated testing identifying the number of waveforms which results in a ringdown estimation closest to the actual simulated ringdown.

The signal processor determines whether the set of waveforms is evenly distributed (504). The firing rate of the downhole tool affects the frequency with which waveforms are detected. For example, a tool may fire an interrogation waveform every 1 second or every 5 seconds, or in the case of high resolution imaging, a tool may fire more than 1,000 times within a one-inch depth of penetration. The frequency may also be adjusted based on the speed with which the tool is moving through a borehole. As a result, the set of waveforms retrieved by the signal processor may not always include a same number of waveforms or contain waveforms which have an even distribution of echo arrival times (i.e., a time of flight for a fired interrogation waveform) as described in more detail to FIG. 7. An even distribution of waveforms is beneficial when estimating ringdown noise, so the signal processor analyzes the set of waveforms to determine whether the waveforms are evenly distributed. Echo arrival times can be affected by borehole standoff, so waveforms with an even distribution of echo arrival times will likely have evenly (or nearly even) distributed standoffs. Standoff can be affected by a borehole shape, a location of the downhole tool, or the tool rotation speed. In addition to analyzing distribution, the signal processor may also determine whether a frequency or density of the set of waveforms is too high or exceeds a threshold. Waveforms which are too close together in time can negatively affect a ringdown estimation. The signal processor may analyze timestamps of the waveforms to determine whether any are too close in time, e.g. collected within less than a second of each other. Alternatively, the signal processor can determine a firing rate of the downhole tool and determine whether the firing rate exceeds a frequency threshold which would cause the waveforms to be too close in time. If any waveforms are too close in time, the signal processor can determine that the distribution of the set of waveforms is not ideal, even if the waveforms were recorded at regular intervals.

If the set of waveforms are not evenly distributed or the distribution is not ideal, the signal processor removes select waveforms from the set of waveforms (506). The signal processor removes waveforms so that waveforms with a uniform distribution of echo arrival times remain in the set of waveforms. The selection of the waveforms to create a uniform distribution may be based on calculated echo arrival times. The echo arrival time is equal to distance to target divided by the velocity of the interrogation waveform. The echo arrival times can also be determined for each waveform by identifying a maximum amplitude in the waveform, performing cross-correlation, deconvolution, or a Hilbert transform. To achieve a uniform distribution, the signal processor can plot the echo arrival times using a histogram and remove select waveforms to flatten the histogram. In instances where waveforms were collected too close in time, i.e. the firing rate of the tool was too high, the signal processor may select regularly spaced waveforms from across the set of waveforms. For example, the signal processor may select every other waveform or every third waveform and remove the unselected waveforms from the set of waveforms.

After removing waveforms from the set of waveforms or after determining that the set of waveforms is evenly distributed, the signal processor calculates a median of the set of waveforms to estimate ringdown noise (508). The signal processor calculates the median using the waveforms remaining in the set of waveforms. The signal processor may calculate the median of the set of waveforms by determining a value at each sampled point in time of the waveforms and determining the median value at each point. For example, if 5 waveforms are sampled at a time of 30 microseconds with signal amplitude values of −1, 0, 2, 4, and 5, the median value 2 is selected and is added to the waveform representing the estimated ringdown. In order to sample the waveforms, the set of waveforms may be aligned based on the firing time of the interrogation waveform so that a sampled point in time of 30 microseconds is determined as 30 microseconds from the firing of the interrogation waveform for each waveform in the set of waveforms. The result of the calculation is a waveform made up of the signal median values from the set of waveforms. The resulting median value waveform is an estimation of ringdown noise experienced by a transducer of the downhole tool.

The signal processor subtracts the estimated ringdown noise from the current waveform (510). To improve the signal of the current waveform, the signal processor removes ringdown noise from the current waveform by subtracting the median value waveform from the current waveform.

The signal processor applies filters to the current waveform to remove additional noise (512). The signal processor may apply high-pass or low-pass filters to the waveform to isolate the desired signals. For example, high frequency trailing wave can be filtered using a low-pass filter. The frequency of the high frequency noise can be estimated using the following expression, assuming that the set of waveforms was adjusted for an even distribution of echo arrival times:

$$f_H = \frac{N}{tt_{max} - tt_{min}} = \frac{Nv_{mud}}{2(SO_{max} - SO_{min})} \quad (1)$$

In this equation, N equals the number of waveforms in the set of waveforms, tt is the echo time of arrivals, $v_{mud}$ is the sound velocity in mud, and SO is the standoff of the borehole. The variable $v_{mud}$ may be adjusted based on whether the mud is a water-based mud or an oil-based mud. Once the estimated frequency of the high frequency noise is determined, a frequency below the estimated frequency is chosen for the low pass filter. For example, if the frequency estimation is 1,000 kilohertz, the signal processor may set a frequency of 800 kilohertz for the low-pass filter. The frequency for the low-pass filter is set below the high frequency noise estimation but above an estimated frequency spectrum for the desired signal in the current waveform. For example, if the current waveform has a signal as high as 500 kilohertz, a frequency above 500 kilohertz is chosen to avoid filtering out the desired signal. Other signal processing may be performed, such as time gain compensation, to better improve the signal to noise ration.

The signal processor provides the processed waveform for analysis (514). For example, the signal processor may supply the processed waveform to an ultrasound imaging system or other borehole imaging system. Performing such tasks with the processed waveform will result in improved, more accurate imaging since the ringdown noise and other noise has been removed, thereby improving the signal to noise ratio.

In some implementations, the operations of blocks 504 and 506 may not be performed. Ensuring a uniform distribution of waveforms can lead to an improved estimation of ringdown noise but is not required. Even without a uniform distribution of waveforms, using a median of the set of waveforms leads to an improved estimation of ringdown noise versus other estimation techniques, such as taking a mean of the waveforms as shown in more detail in FIG. 6.

Figure 6:
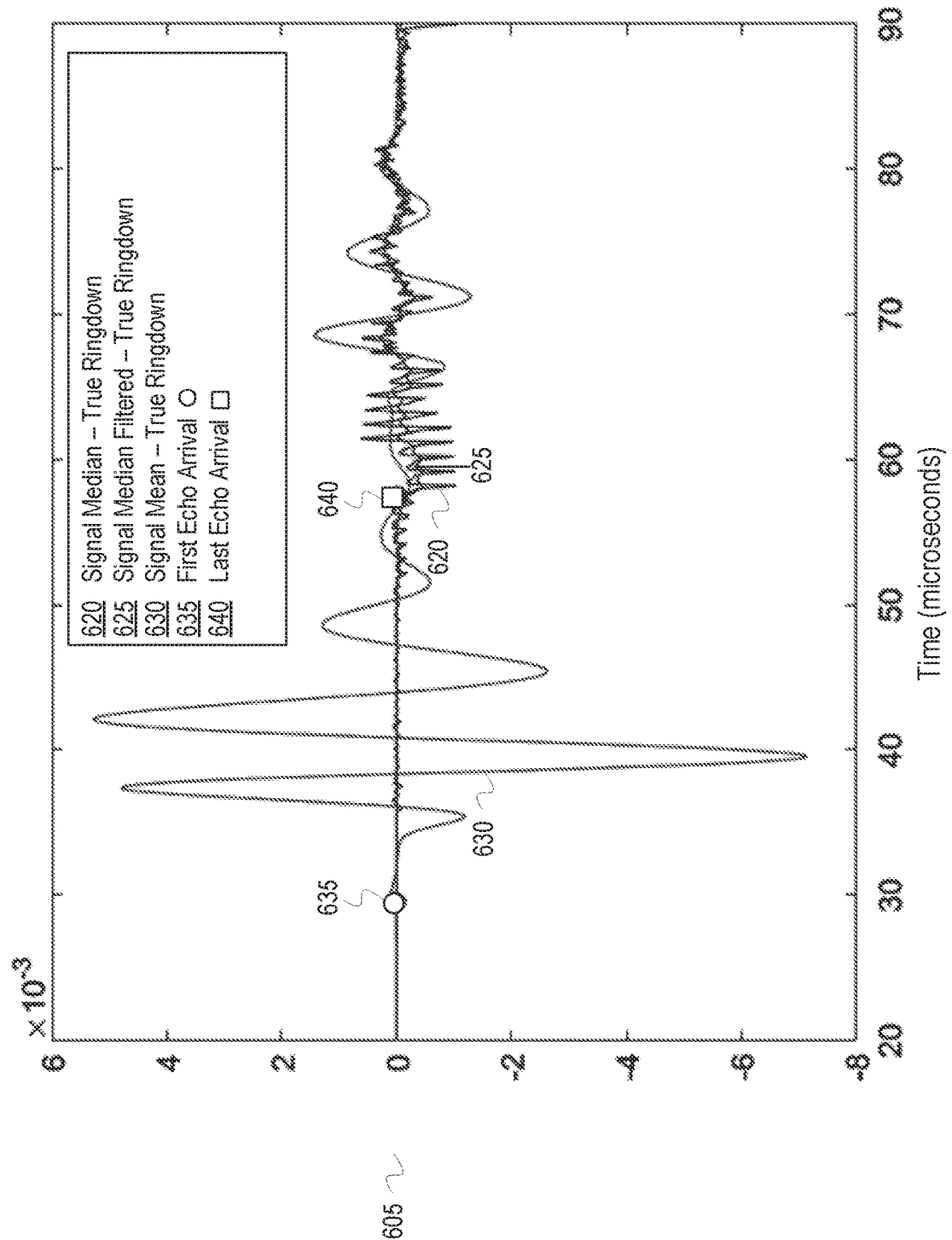
FIG. 6 is a diagram depicting illustrative waveforms showing the use of a signal median in reducing ringdown noise.

FIG. 6 is a diagram depicting illustrative waveforms showing the use of a signal median in reducing ringdown noise. FIG. 6 depicts a graph 605 with illustrative waveforms 620, 625, and 630. Each of the waveforms in the graph 605 were generated during a synthetically constructed simulation based on experimental data. The waveform 620 is the result of taking a median of a set of waveforms and subtracting the true ringdown noise, which was known during the simulation. The waveform 625 is the result of taking the median of the set of waveforms, filtering the signal median, and then subtracting the true ringdown noise. The waveform 630 is the result of taking a mean of a set of waveforms and subtracting the true ringdown noise. The graph also depicts a first echo arrival 635 and a last echo arrival 640. The first echo arrival 635 corresponds to the echo arrival of a waveform in the set of waveforms which was earliest in time compared to the other waveforms in the set. The last echo arrival 640 corresponds to the echo arrival of a waveform in the set of waveforms which was the latest in time compared to the other waveforms in the set.

If a waveform were an exact estimation of the true ringdown, the waveform in the graph 605 would be a flat line with zero amplitude. As shown between the first echo arrival 635 and the last echo arrival 640, the waveforms 620 and 625 have minimal, near zero amplitudes which indicates that the median of the set of waveforms is an accurate estimation of the true ringdown during the simulation. This is because within this time span, there are some waveforms with no echo arrival. Hence, the waveform only contains ringdown which will likely be accurately determined by taking a median over the time span. Conversely, the waveform 630, which was based on a mean of the waveforms, has a much larger discrepancy from the true ringdown and, therefore, exhibits higher amplitude. Therefore, the median of a set of waveforms is a more accurate estimation of the ringdown noise compared to an average or mean of the waveforms.

After the last echo arrival time 640, all waveforms contain either echo or reverberations from previously received echoes. Taking median of the waveforms produces a high frequency noise due to taking values from adjacent waveforms. The waveform 625 does not exhibit the high frequency noise because the signal median of the waveforms was filtered, e.g. with a low-pass filter, prior to subtracting the true ringdown noise.

Figure 7:
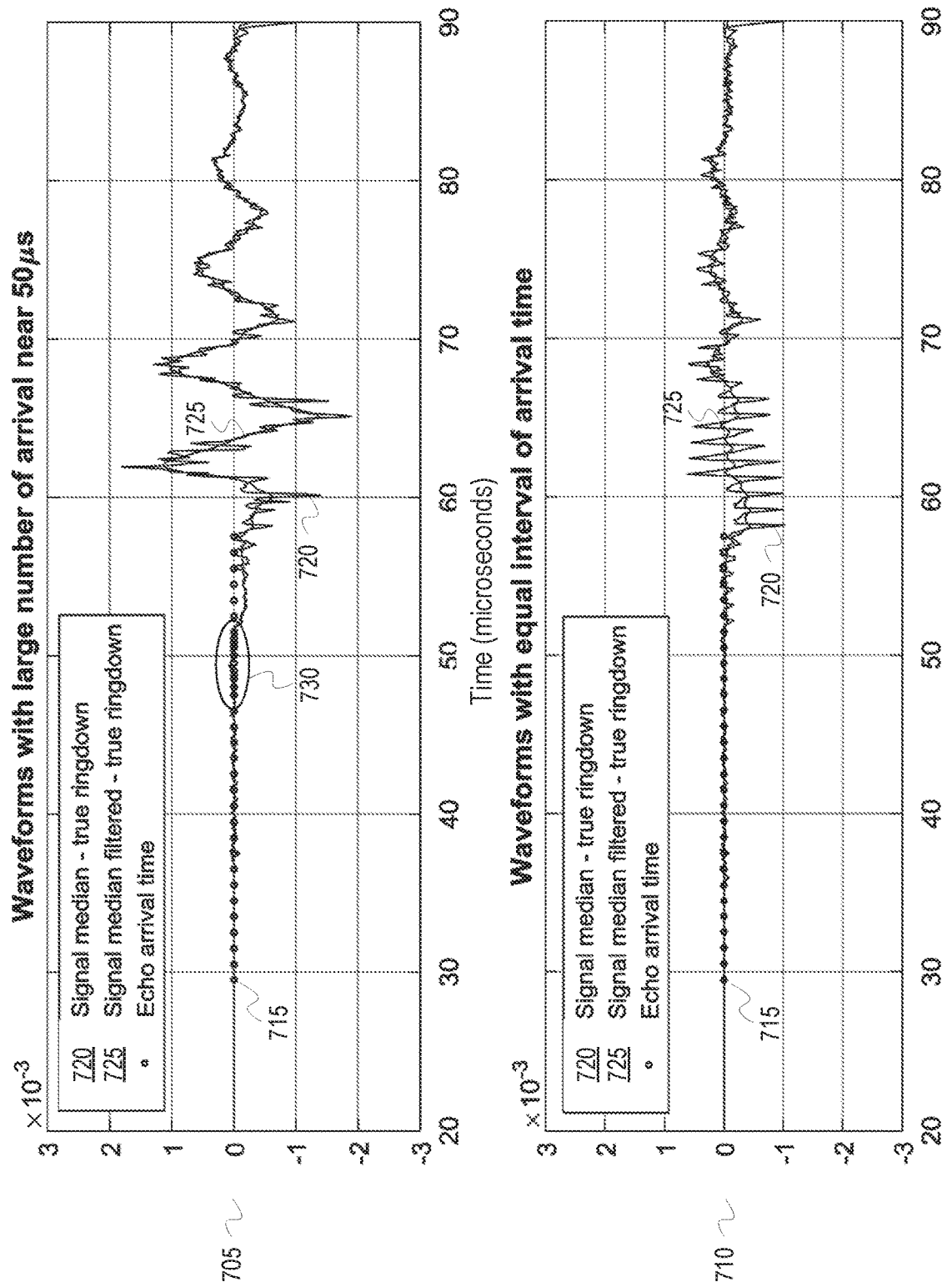
FIG. 7 is a diagram with illustrative waveforms depicting an even distribution of echo arrival times.

FIG. 7 is a diagram with illustrative waveforms and a depiction of an echo arrival time distribution. FIG. 7 depicts a graph 705 and a graph 710 with illustrative waveforms 720 and 725. The waveform 720 is the result of taking a median of a set of waveforms and subtracting the true ringdown noise. The waveform 725 is the result of taking the median of the set of waveforms, filtering the signal median, and then subtracting the true ringdown noise. The graphs 705 and 710 also include dots indicating echo arrival times 715 for the waveforms used to determine the signal median for the waveforms 720 and 725.

The echo arrival times 715 in the graph 705 include a cluster 730 of echo arrivals centered around the fifty microsecond marker. The cluster 730 indicates that multiple waveforms used to calculate the signal median had echo arrivals around the same time. In some instances, when a drill string is sticking or is stuck for example, the standoff of the downhole tool may not vary significantly within a number of firings leading to multiple waveforms with similar echo arrival times of the waveforms. As shown by the waveforms 720 and 725, the cluster 730 of echo arrival times caused a discrepancy from the true ringdown in the signal median after fifty microseconds. To reduce this discrepancy, waveforms with echo arrivals within the cluster 730 may be removed from the set of waveforms used to calculate the median. The waveforms may be removed so that the remaining echo arrival times are spaced at even intervals. As shown in graph 710, the cluster 730 no longer exists, and instead, there is an even distribution of the echo arrival times. The waveforms 720 and 725 each have lower amplitudes demonstrating the improved estimation of ringdown noise resulting from the even distribution of echo arrivals 715.

In some implementations, a signal processor may control, or communicate with another component, to control the firings of a downhole tool. The signal processor may fire a number of test waveforms and calculate an average echo arrival time based on the echo arrival time for each of the fired waveforms. The signal processor can then, based on the average echo arrival time, determine an ideal firing rate for test waveforms which will result in approximately, evenly spaced echo arrival times. The signal processor may also consider the travel distance of the tool during the test firings and determine a firing rate in coordination with a velocity of the tool. For example, if the tool is moving at 1 meter per second, the firing rate may be less than if the tool is moving at 5 meters per second. By proactively controlling the firings, the signal processor can reduce the amount of post-processing required to reduce clusters such as the cluster 730. As described above, the cluster 730 may be caused by a downhole tool which is stuck in place but still firing interrogation waveforms. By tying the firing rate of the tool to traveled distance, the signal processor can prevent clusters of echo arrivals, as the firing rate will be lower or 0 when the tool is stuck or moving slowly.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel, and the operations may be performed in a different order. For example, the operations depicted in blocks 504 and 506 of FIG. 5 can be performed in parallel or concurrently. Additionally, with respect to FIG. 5, block 512 may be performed prior to block 510. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like, a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
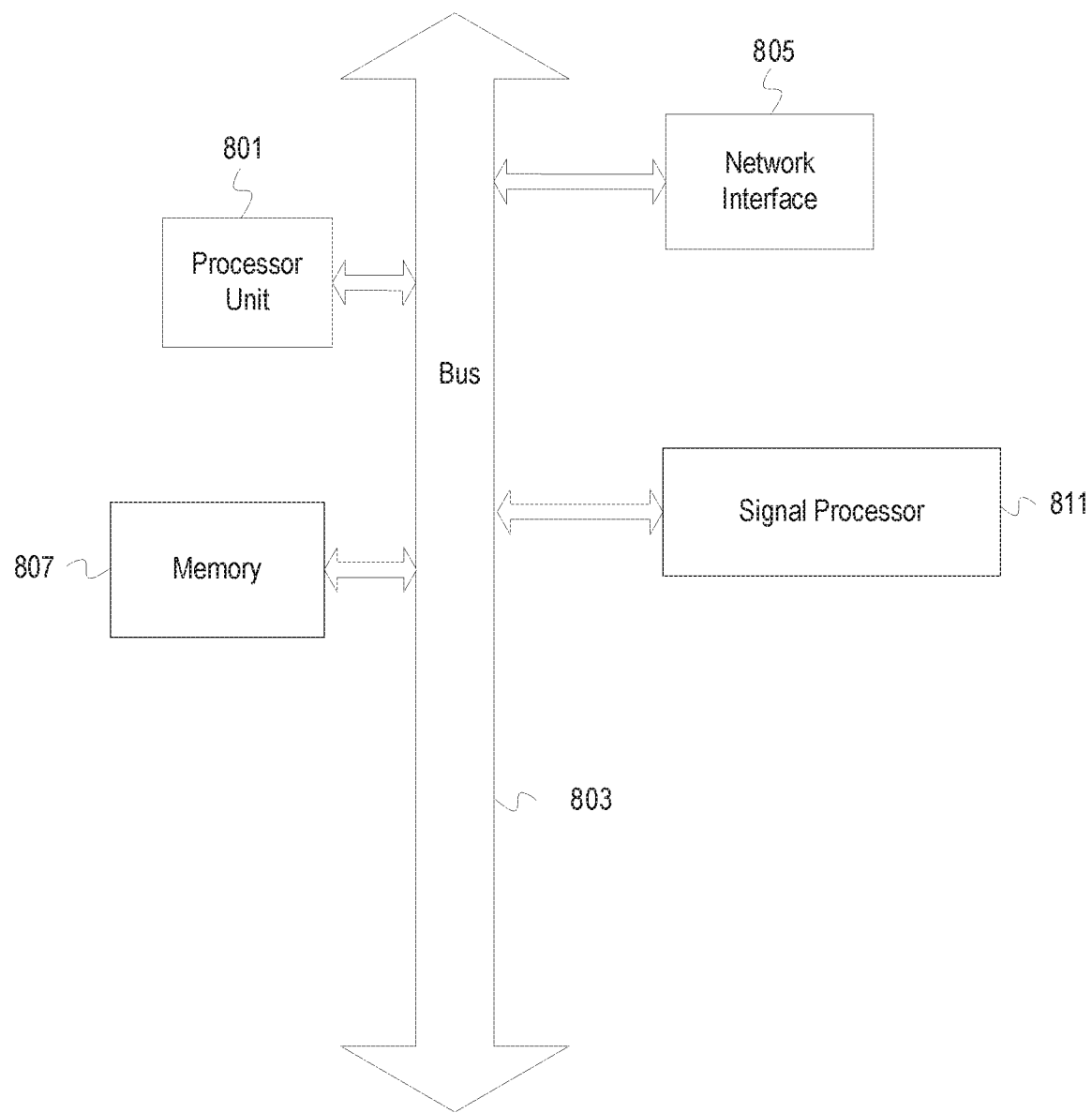
FIG. 8 depicts an example computer system with a signal processor.

FIG. 8 depicts an example computer system with a signal processor. The computer system includes a processor unit 801 (possibly including multiple processors, multiple cores, multiple nodes, and/or implementing multi-threading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI, ISA, PCI-Express, Hyper-Transport® bus, InfiniBand® bus, NuBus, etc.) and a network interface 805 (e.g., a Fiber Channel interface, an Ethernet interface, an internet small computer system interface, SONET interface, wireless interface, etc.). The system also includes a signal processor 811. The signal processor 811 estimates and reduces ringdown noise from waveforms detected by a downhole tool. Any one of the previously described functionalities may be partially (or entirely) implemented in hardware and/or on the processor unit 801. For example, the functionality may be implemented with an application specific integrated circuit, in logic implemented in the processor unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801 and the network interface 805 are coupled to the bus 803. Although illustrated as being coupled to the bus 803, the memory 807 may be coupled to the processor unit 801.

While the aspects of the disclosure are described with reference to various implementations and exploitations, it will be understood that these aspects are illustrative and that the scope of the claims is not limited to them. In general, techniques for removing ringdown noise as described herein may be implemented with facilities consistent with any hardware system or hardware systems. Many variations, modifications, additions, and improvements are possible.

Example Embodiments

A. A method that includes firing a plurality of interrogation waveforms into a formation by a first transducer of a downhole tool disposed in a borehole; detecting a plurality of waveforms received in response to the firing of the plurality of interrogation waveforms; calculating a median of a set of the plurality of waveforms to estimate a ringdown noise; subtracting the ringdown noise from a first waveform of the plurality of waveforms; and providing the first waveform for analysis of the formation.

B. One or more non-transitory machine-readable media comprising program code, the program code to fire a plurality of interrogation waveforms into a formation using a first transducer of a downhole tool disposed in a borehole; detect a plurality of waveforms received in response to the firing of the plurality of interrogation waveforms; calculate a median of a set of the plurality of waveforms to estimate a ringdown noise; subtract the ringdown noise from a first waveform of the plurality of waveforms; and provide the first waveform for analysis of the formation.

C. An apparatus that includes a first transducer of a downhole tool disposed in a borehole; a processor; and a machine-readable medium having program code executable by the processor to cause the apparatus to, fire a plurality of interrogation waveforms into a formation using the first transducer; detect a plurality of waveforms received in response to the firing of the plurality of interrogation waveforms; calculate a median of a set of the plurality of waveforms to estimate a ringdown noise; subtract the ringdown noise from a first waveform of the plurality of waveforms; and provide the first waveform for analysis of the formation.

Each of the embodiments A, B, and C may have one or more of the following additional elements in any combination.

Element 1: further comprising calculating echo arrival times for each of the plurality of waveforms; and selecting the set of waveforms from the plurality of waveforms based, at least in part, on the echo arrival times.

Element 2: wherein the set of waveforms is selected so that the echo arrival times are evenly distributed in time across the set of waveforms.

Element 3: further comprising estimating a frequency of high frequency noise in the set of waveforms based, at least in part, on at least one of a number of waveforms in the set of waveforms, echo arrival times for the set of waveforms, and a borehole standoff; and applying a low-pass filter configured to remove signals with frequency greater than the estimated frequency.

Element 4: further comprising determining an average echo arrival time for the plurality of waveforms; determining a velocity of the downhole tool within the borehole; and adjusting a firing rate of the downhole tool based, at least in part, on at least one of the average echo arrival time and the velocity of the downhole tool.

Element 5: further comprising determining that a firing rate of the first transducer exceeds a threshold; and selecting a number of waveforms from the plurality of waveforms to satisfy the threshold.

Element 6: further comprising determining that a second transducer of the downhole tool has been activated; and based on detecting that the second transducer has been activated, recalculating the ringdown noise using waveforms detected by the second transducer.

By way of non-limiting example, exemplary combinations applicable to A, B, and C include Element 2 with Element 1.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
   firing a plurality of interrogation waveforms into a formation by a first transducer of a downhole tool disposed in a borehole;
   detecting a plurality of waveforms received in response to the firing of the plurality of interrogation waveforms;

calculating a median value waveform of a set of the plurality of waveforms to estimate a ringdown noise, wherein the ringdown noise is a time domain signal, and wherein calculating the median value waveform includes determining a value at each sampled point in time of the waveforms received and determining the median value at each point;

subtracting the ringdown noise from a first waveform of the plurality of waveforms; and providing the first waveform for analysis of the formation.

2. The method of claim 1 further comprising:

calculating echo arrival times for each of the plurality of waveforms; and selecting the set of waveforms from the plurality of waveforms based, at least in part, on the echo arrival times.

3. The method of claim 2, wherein the set of waveforms is selected so that the echo arrival times are evenly distributed in time across the set of waveforms.

4. The method of claim 1 further comprising:

estimating a frequency of high frequency noise in the set of waveforms based, at least in part, on at least one of a number of waveforms in the set of waveforms, echo arrival times for the set of waveforms, and a borehole standoff; and applying a low-pass filter configured to remove signals with frequency greater than the estimated frequency.

5. The method of claim 1 further comprising:

determining an average echo arrival time for the plurality of waveforms;

determining a velocity of the downhole tool within the borehole; and adjusting a firing rate of the downhole tool based, at least in part, on at least one of the average echo arrival time and the velocity of the downhole tool.

6. The method of claim 1 further comprising:

determining that a firing rate of the first transducer exceeds a threshold; and selecting a number of waveforms from the plurality of waveforms to satisfy the threshold.

7. The method of claim 1 further comprising:

determining that a second transducer of the downhole tool has been activated; and based on detecting that the second transducer has been activated, recalculating the ringdown noise using waveforms detected by the second transducer.

8. One or more non-transitory machine-readable media comprising program code, the program code to:

fire a plurality of interrogation waveforms into a formation using a first transducer of a downhole tool disposed in a borehole;

detect a plurality of waveforms received in response to the firing of the plurality of interrogation waveforms;

calculate a median value waveform of a set of the plurality of waveforms to estimate a ringdown noise, wherein the ringdown noise is a time domain signal, and wherein calculating the median value waveform includes determining a value at each sampled point in time of the waveforms received and determining the median value at each point;

subtract the ringdown noise from a first waveform of the plurality of waveforms; and provide the first waveform for analysis of the formation.

9. The one or more non-transitory machine-readable media of claim 8 further comprising program code to:

calculate echo arrival times for each of the plurality of waveforms; and select the set of waveforms from the plurality of waveforms based, at least in part, on the echo arrival times.

10. The one or more non-transitory machine-readable media of claim 9, wherein the set of waveforms is selected so that the echo arrival times are evenly distributed in time across the set of waveforms.

11. The one or more non-transitory machine-readable media of claim 8 further comprising program code to:

estimate a frequency of high frequency noise in the set of waveforms based, at least in part, on at least one of a number of waveforms in the set of waveforms, echo arrival times for the set of waveforms, and a borehole standoff; and apply a low-pass filter configured to remove signals with frequency greater than the estimated frequency.

12. The one or more non-transitory machine-readable media of claim 8 further comprising program code to:

determine an average echo arrival time for the plurality of waveforms;

determine a velocity of the downhole tool within the borehole; and adjust a firing rate of the downhole tool based, at least in part, on at least one of the average echo arrival time and the velocity of the downhole tool.

13. The one or more non-transitory machine-readable media of claim 8 further comprising program code to:

determine that a second transducer of the downhole tool has been activated; and based on detecting that the second transducer has been activated, recalculate the ringdown noise using waveforms detected by the second transducer.

14. An apparatus comprising:

a first transducer of a downhole tool disposed in a borehole;

a processor; and a machine-readable medium having program code executable by the processor to cause the apparatus to, fire a plurality of interrogation waveforms into a formation using the first transducer;

detect a plurality of waveforms received in response to the firing of the plurality of interrogation waveforms;

calculate a median value waveform of a set of the plurality of waveforms to estimate a ringdown noise, wherein the ringdown noise is a time domain signal, and wherein calculating the median value waveform includes determining a value at each sampled point in time of the waveforms received and determining the median value at each point;

subtract the ringdown noise from a first waveform of the plurality of waveforms; and provide the first waveform for analysis of the formation.

15. The apparatus of claim 14 further comprising program code to:

calculate echo arrival times for each of the plurality of waveforms; and select the set of waveforms from the plurality of waveforms based, at least in part, on the echo arrival times.

16. The apparatus of claim 15, wherein the set of waveforms is selected so that the echo arrival times are evenly distributed in time across the set of waveforms.

17. The apparatus of claim 14 further comprising program code to:

estimate a frequency of high frequency noise in the set of waveforms based, at least in part, on at least one of a number of waveforms in the set of waveforms, echo arrival times for the set of waveforms, and a borehole standoff; and apply a low-pass filter configured to remove signals with frequency greater than the estimated frequency.

18. The apparatus of claim 14 further comprising program code to:

determine an average echo arrival time for the plurality of waveforms;

determine a velocity of the downhole tool within the borehole; and adjust a firing rate of the downhole tool based, at least in part, on at least one of the average echo arrival time and the velocity of the downhole tool.

19. The apparatus of claim 14 further comprising program code to:

determine that a firing rate of the first transducer exceeds a threshold; and select a number of waveforms from the plurality of waveforms to satisfy the threshold.

20. The apparatus of claim 14 further comprising a second transducer and program code to:

determine that the second transducer has been activated; and based on detecting that the second transducer has been activated, recalculate the ringdown noise using waveforms detected by the second transducer.

\* \* \* \* \*